US012811317B2

(12) United States Patent
Hasegawa et al.

(10) Patent No.: US 12,811,317 B2
(45) Date of Patent: Nov. 24, 2026

(54) LEAD BLOCK AND ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Yuya Hasegawa, Inukami-gun (JP); Shingo Nambu, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 152 days.

(21) Appl. No.: 18/522,238

(22) Filed: Nov. 29, 2023

(65) Prior Publication Data

US 2024/0097361 A1 Mar. 21, 2024

Related U.S. Application Data

(63) Continuation of application No. PCT/JP2022/022953, filed on Jun. 7, 2022.

(30) Foreign Application Priority Data

Jun. 11, 2021 (JP) ................................ 2021-098175

(51) Int. Cl.
*H01R 9/24* (2006.01)
*H01R 35/02* (2006.01)

(52) U.S. Cl.
CPC ............... *H01R 9/24* (2013.01); *H01R 35/02* (2013.01); *H01R 2201/26* (2013.01)

(58) Field of Classification Search
None
See application file for complete search history.

(56) References Cited

U.S. PATENT DOCUMENTS 5,951,322 A 9/1999 Nishikigi
6,733,300 B2 * 5/2004 Oguma ................. H01R 35/02 439/15

(Continued)

FOREIGN PATENT DOCUMENTS

| | | |
|---|---|---|
| EP | 1850418 | 10/2007 |
| JP | H10-144371 | 5/1998 |
| WO | WO 2018/047581 | 3/2018 |

OTHER PUBLICATIONS

Written Opinion for corresponding International Application No. PCT/JP2022/022953, Sep. 6, 2022.

(Continued)

*Primary Examiner* — Felix O Figueroa
(74) *Attorney, Agent, or Firm* — Mori & Ward, LLP

(57) ABSTRACT

A lead block includes a lead block body and a plurality of bus bars. The plurality of bus bars include a plurality of connection pins and a plurality of conductor connecting portions. At least one of the plurality of conductor connecting portions includes an exposed surface and a connection projection. The connection projection protrudes from the exposed surface in a perpendicular direction and is configured to be connected to a conductor of an electrical cable. The connection projection is disposed in a first region with respect to the exposed surface in the perpendicular direction. The lead block body includes a cable-facing surface provided facing the electrical cable in a state where the connection projection is connected to the conductor of the electrical cable. The cable-facing surface is offset in the perpendicular direction from the exposed surface and is disposed in the first region with respect to the exposed surface.

12 Claims, 16 Drawing Sheets

(56) References Cited

U.S. PATENT DOCUMENTS

| | | | | |
|---|---|---|---|---|
| 11,616,318 | B2 * | 3/2023 | Yamamoto | H01R 4/305 439/752 |
| 11,909,149 | B2 * | 2/2024 | Kitao | H02G 11/02 |
| 12,388,226 | B2 * | 8/2025 | Kakudo | H01R 13/405 |
| 2007/0259577 | A1 | 11/2007 | Stromiedel | |
| 2019/0207352 | A1 | 7/2019 | Ushiyama | |

OTHER PUBLICATIONS

International Search Report for corresponding International Application No. PCT/JP2022/022953, Sep. 6, 2022.
Extended European Search Report for corresponding EP Application No. 22820214.9-1201, Sep. 9, 2024.
Japanese Office Action for corresponding JP Application No. 2023-527871, Apr. 21, 2026 (w/ English machine translation).
Korean Office Action for corresponding KR Application No. 10-2023-7038703, May 18, 2026 (w/ English machine translation).
Chinese Office Action for corresponding CN Application No. 202280036998.3, May 17, 2026 (w/ English machine translation).
Japanese Office Action for corresponding JP Application No. 2023-527871, Aug. 4, 2026 (w/ English machine translation).
Chinese Office Action for corresponding CN Application No. 202280036998.3, Sep. 8, 2026 (w/ English machine translation).

* cited by examiner

LEAD BLOCK AND ROTARY CONNECTOR DEVICE

CROSS-REFERENCE TO RELATED APPLICATIONS

The present application is a continuation application of International Application No. PCT/JP2022/022953, filed Jun. 7, 2022, which claims priority to Japanese Patent Application No. 2021-098175 filed Jun. 11, 2021. The contents of these applications are incorporated herein by reference in their entirety.

BACKGROUND

Technical Field

The technology disclosed in the present application relates to a lead block and a rotary connector device.

Background Art

International patent application publication WO 2018/047581 describes a rotary connector device including a lead block.

SUMMARY

According to one aspect, a lead block includes a lead block body and a plurality of bus bars. The lead block body includes an electrically insulating material. The plurality of bus bars are partially provided in the lead block body and include a conductive material. The plurality of bus bars include a plurality of connection pins and a plurality of conductor connecting portions. The plurality of connection pins are exposed from the lead block body and are electrically connectable to a connector of an external electrical cable. The plurality of conductor connecting portions are exposed from the lead block body and configured to be electrically connected to a plurality of conductors of an electrical cable, respectively. The plurality of conductor connecting portions each extend in a longitudinal direction and are disposed at intervals in an arrangement direction perpendicular to the longitudinal direction. At least one of the plurality of conductor connecting portions includes an exposed surface and a connection projection. The exposed surface faces a perpendicular direction perpendicular to the longitudinal direction and the arrangement direction. The connection projection protrudes from the exposed surface in the perpendicular direction and is configured to be connected to a conductor of the plurality of conductors of the electrical cable. The connection projection is disposed in a first region with respect to the exposed surface in the perpendicular direction. The lead block body includes a cable-facing surface provided facing the electrical cable in a state where the connection projection is connected to the conductor of the electrical cable. The cable-facing surface is offset in the perpendicular direction from the exposed surface and is disposed in the first region with respect to the exposed surface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
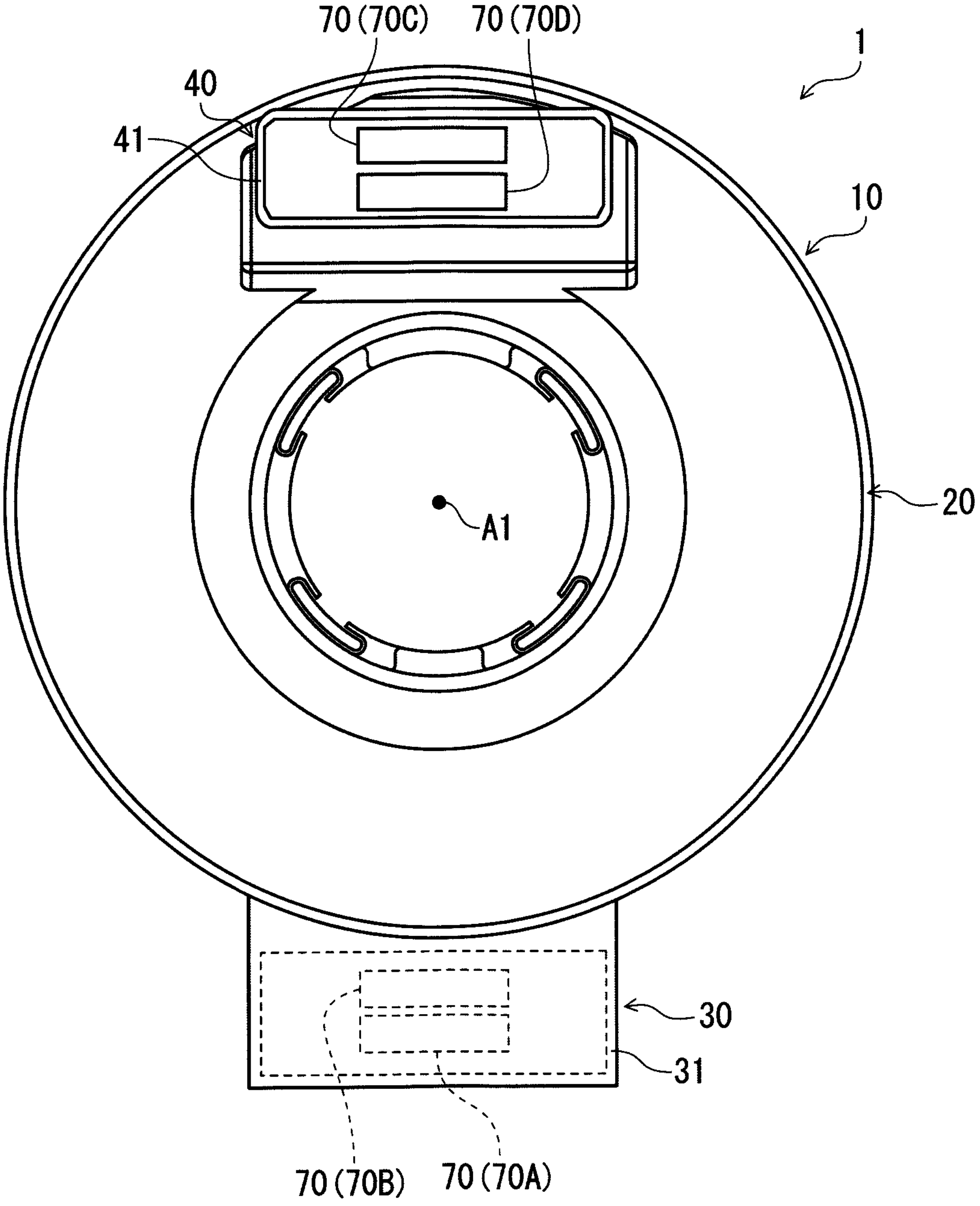
FIG. 1 is a plan view of a rotary connector device.

Embodiments will be described below with reference to the drawings. In the drawings, the same reference signs indicate corresponding or identical configurations.

As illustrated in FIG. 1, a rotary connector device 1 includes a stator 10 and a rotator 20. The stator 10 is configured to be attached to a vehicle body. The rotator 20 is provided rotatably about a rotation axis A1 with respect to the stator 10. The rotator 20 is configured to be fixed to a steering wheel. The rotary connector device 1 includes a first connector 30 and a second connector 40. The first connector 30 is provided at the stator 10. The second connector 40 is provided at the rotator 20.

The first connector 30 is configured to be detachably mounted with a vehicle body side connector. The first connector 30 includes a first connector housing portion 31 into which the vehicle body side connector is inserted. The vehicle body side connector is electrically connected to an electric circuit such as a control device. The second connector 40 is configured to be detachably mounted with a steering side connector. The second connector 40 includes a second connector housing portion 41 into which the steering side connector is inserted. The steering side connector is electrically connected to electric circuits such as switches for the steering wheel and an airbag device. The vehicle body side connector and the steering side connector may also be referred to as external connectors.

Figure 2:
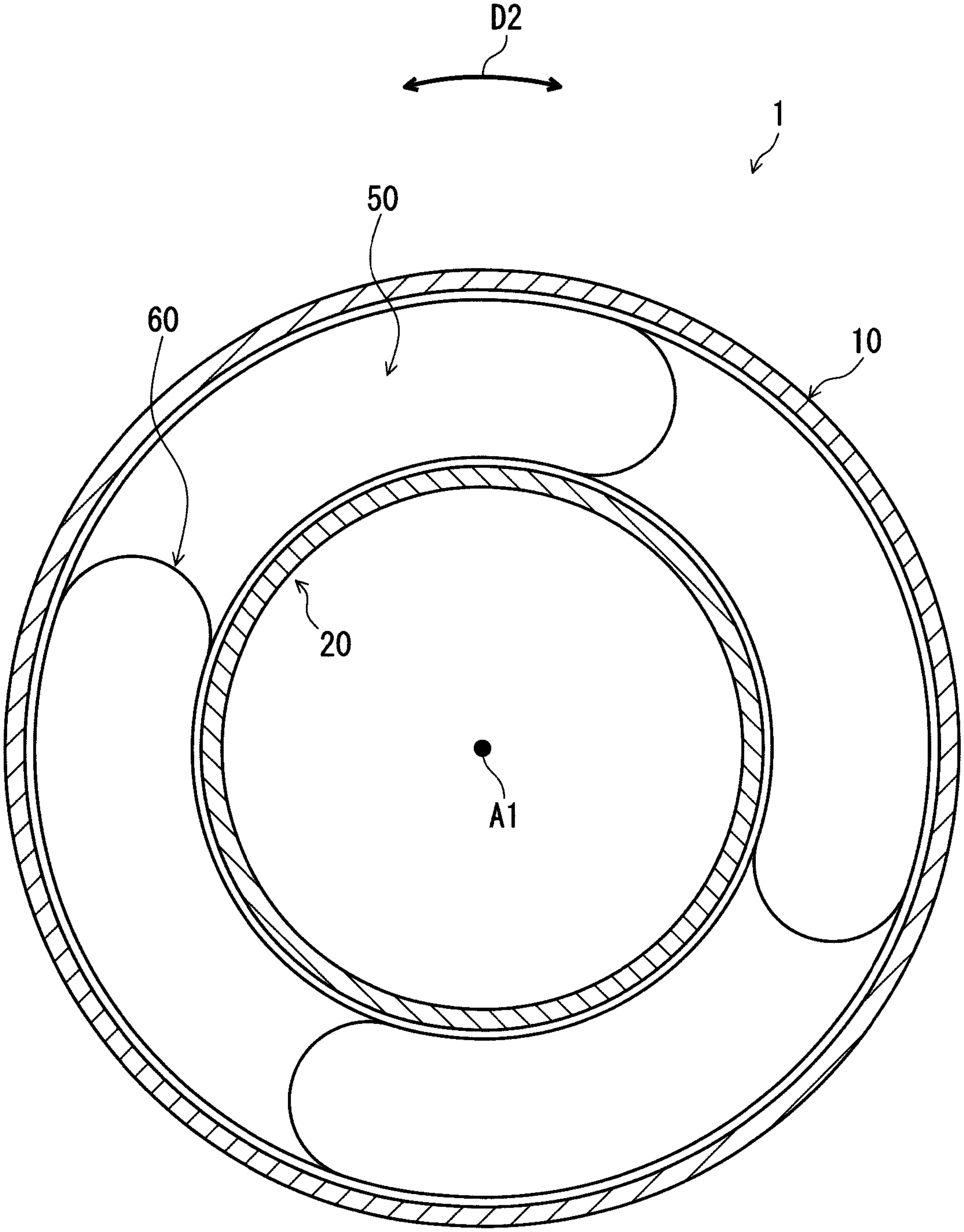
FIG. 2 is a cross-sectional view of the rotary connector device illustrated in FIG. 1.

As illustrated in FIG. 2, the stator 10 and the rotator 20 define a cable housing space 50 between the stator 10 and the rotator 20, the cable housing space being provided surrounding the rotation axis A1. For example, the cable housing space 50 is annular and extends in the circumferential direction D2 with respect to the rotation axis A1. The rotary connector device 1 includes an electrical cable 60. The electrical cable 60 electrically connects the first connector 30 to the second connector 40. The electrical cable 60 is disposed in the cable housing space 50. The electrical cable 60 is flexible and has a flat shape. The electrical cable 60 can also be referred to as a flexible flat cable.

As illustrated in FIG. 1, the rotary connector device 1 includes a lead block 70. In the present embodiment, the rotary connector device 1 includes a plurality of the lead blocks 70. Lead blocks 70A and 70B of the plurality of lead blocks 70 are attached to the stator 10. The lead blocks 70A and 70B are disposed in the first connector housing portion 31. The lead blocks 70C and 70D of the plurality of lead blocks 70 are attached to the rotator 20. The lead blocks 70C and 70D are disposed in the second connector housing portion 41. The first connector 30 includes lead blocks 70A and 70B. The second connector 40 includes lead blocks 70C and 70D. However, the total number of the lead blocks 70 is not limited to that of the present embodiment.

Figure 3:
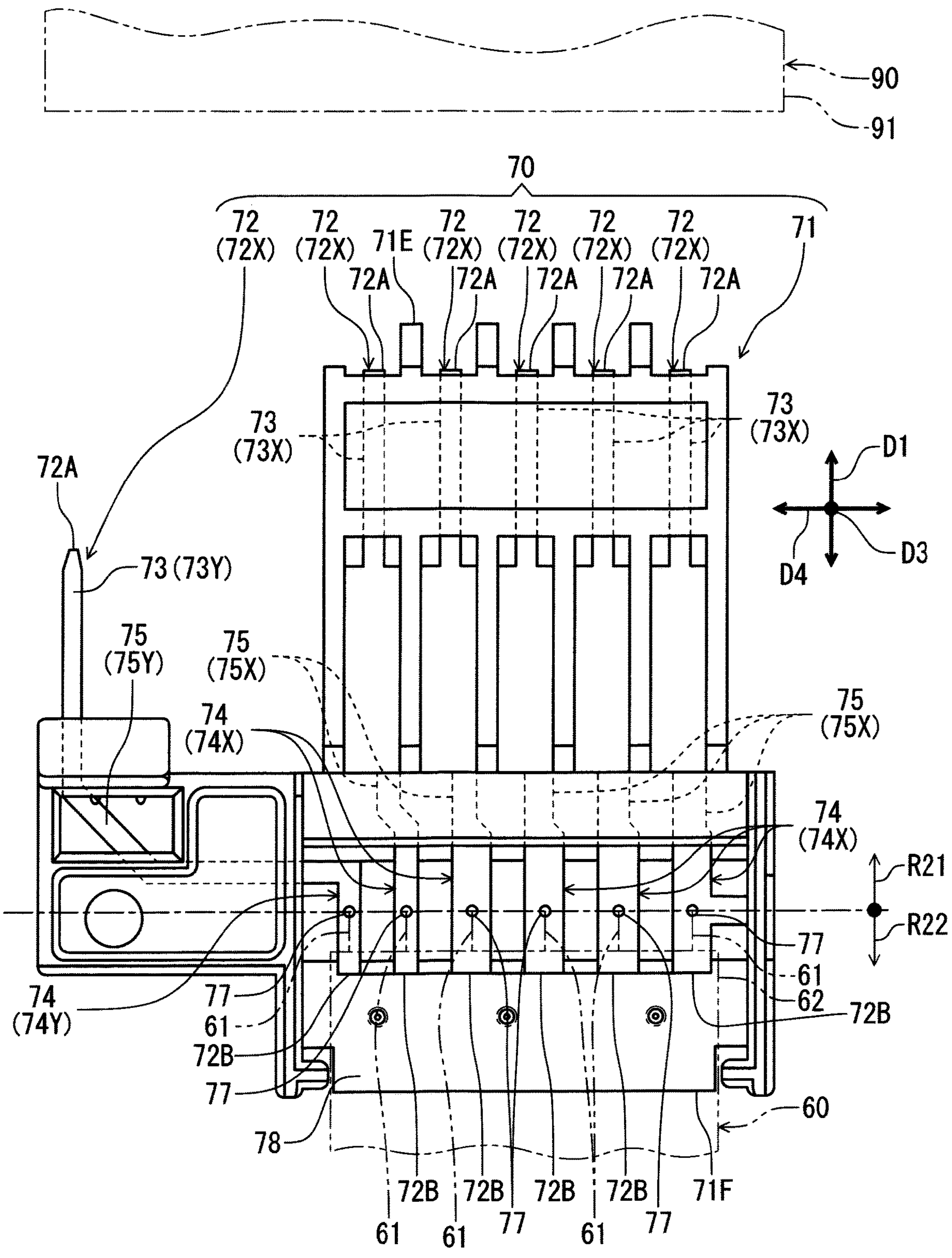
FIG. 3 is a side view of a lead block of the rotary connector device illustrated in FIG. 1.
Figure 4:
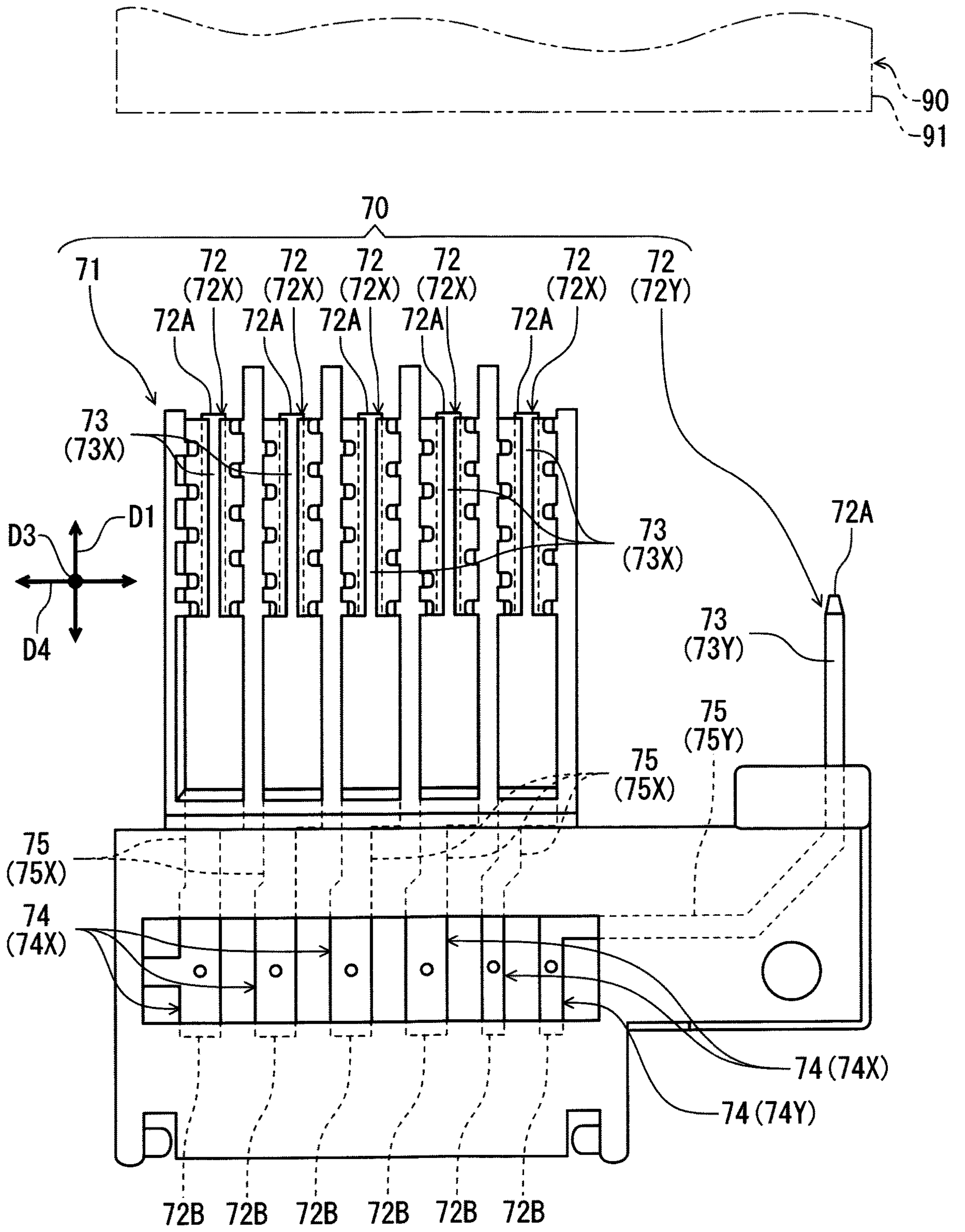
FIG. 4 is a side view of the lead block illustrated in FIG. 3.

As illustrated in FIGS. 3 and 4, the lead block 70 includes a lead block body 71 and a plurality of bus bars 72. The lead block body 71 includes an electrically insulating material. The plurality of bus bars 72 are partially provided in the lead block body 71 and include a conductive material. The electrically insulating material includes, for example, a resin material. The conductive material includes a metal material such as copper, for example. The plurality of bus bars 72 are disposed spaced apart from each other, and are electrically isolated from each other by the lead block body 71. The plurality of bus bars 72 are electrically connected to a plurality of conductors 61 included in the electrical cable 60, respectively.

The plurality of bus bars 72 include a plurality of connection pins 73. The plurality of connection pins 73 correspond to the plurality of bus bars 72, respectively. That is, each of the plurality of bus bars 72 includes the connection pin 73. The plurality of connection pins 73 are exposed from the lead block body 71, and are electrically connectable to a connector 91 of an external electrical cable 90. The connector 91 of the external electrical cable 90 includes a plurality of connection terminals contactable with the plurality of connection pins 73, respectively. In a state where the connector 91 of the external electrical cable 90 is coupled to the lead block 70, the plurality of connection pins 73 are in contact with the plurality of connection terminals of the connector 91.

The plurality of bus bars 72 include a plurality of conductor connecting portions 74. The plurality of conductor connecting portions 74 correspond to the plurality of bus bars 72, respectively. That is, each of the plurality of bus bars 72 includes the conductor connecting portion 74. The plurality of conductor connecting portions 74 correspond to the plurality of connection pins 73, respectively. The plurality of conductor connecting portions 74 are exposed from the lead block body 71 and is configured to be electrically connected to the plurality of conductors 61 of the electrical cable 60, respectively. The plurality of conductor connecting portions 74 each extend in a longitudinal direction D1, and are disposed at intervals in an arrangement direction D4 perpendicular to the longitudinal direction D1.

The plurality of bus bars 72 include a plurality of intermediate portions 75. The plurality of intermediate portions 75 correspond to the plurality of bus bars 72, respectively. That is, each of the plurality of bus bars 72 includes the intermediate portion 75. The plurality of intermediate portions 75 correspond to the plurality of connection pins 73, respectively. The plurality of intermediate portions 75 correspond to the plurality of conductor connecting portions 74, respectively. The plurality of intermediate portions 75 are provided between the plurality of connection pins 73 and the plurality of conductor connecting portions 74. The plurality of intermediate portions 75 are at least partially provided in the lead block body 71. In the present embodiment, the plurality of intermediate portions 75 are partially provided in the lead block body 71. However, the plurality of intermediate portions 75 may be entirely provided in the lead block body 71.

Each of the plurality of bus bars 72 includes a first longitudinal end 72A and a second longitudinal end 72B. Each of the plurality of connection pins 73 includes the first longitudinal end 72A. Each of the plurality of conductor connecting portions 74 includes the second longitudinal end 72B.

In the present embodiment, the plurality of bus bars 72 include at least one first bus bar 72X and at least one second bus bar 72Y. The plurality of bus bars 72 include a plurality of first bus bars 72X, and a second bus bar 72Y. The plurality of first bus bars 72X include a plurality of first connection pins 73X. The second bus bar 72Y includes a second connection pin 73Y. The plurality of first bus bars 72X include a plurality of first conductor connecting portions 74X. The second bus bar 72Y includes a second conductor connecting portion 74Y. The plurality of first bus bars 72X include a plurality of first intermediate portions 75X. The second bus bar 72Y includes a second intermediate portion 75Y. However, the configuration of the plurality of bus bars 72 is not limited to the configuration described above.

Figure 5:
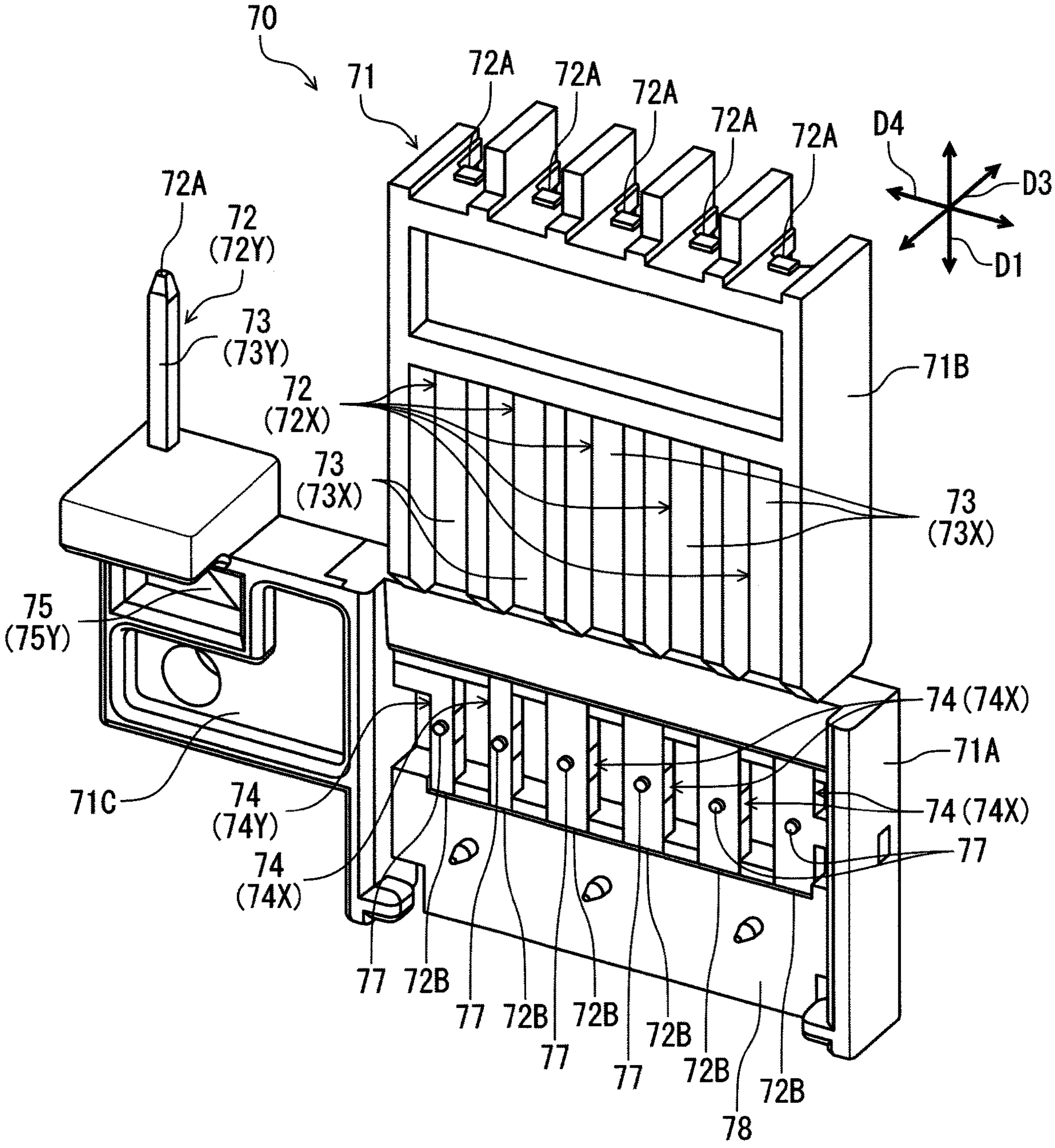
FIG. 5 is a perspective view of the lead block illustrated in FIG. 3.
Figure 6:
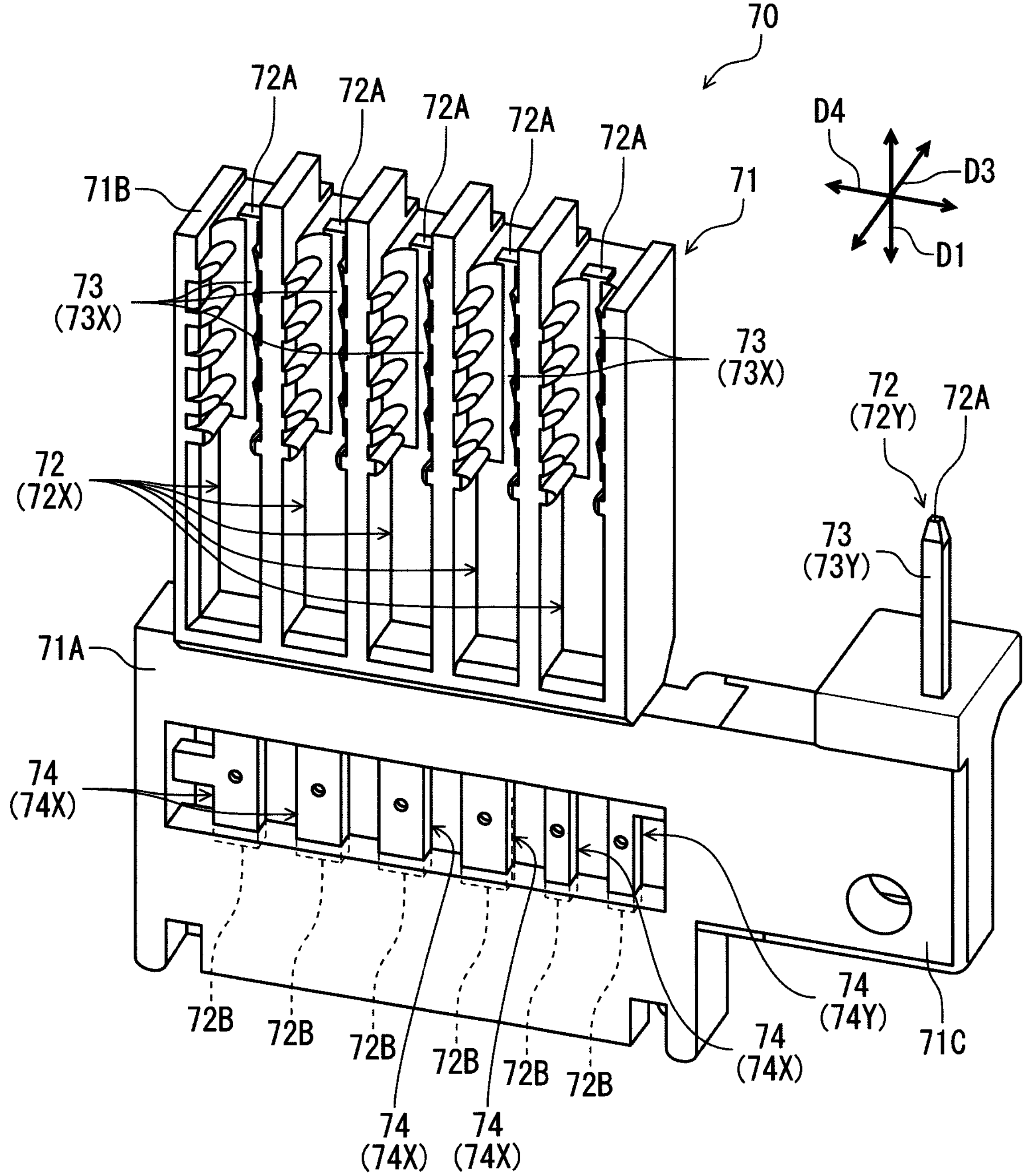
FIG. 6 is a perspective view of the lead block illustrated in FIG. 3.

As illustrated in FIGS. 5 and 6, the lead block body 71 includes a base 71A, a first pin holding portion 71B, and a second pin holding portion 71C. The first pin holding portion 71B extends in the longitudinal direction D1 from the base 71A, and holds the plurality of connection pins 73 (for example, the plurality of first connection pins 73X) at intervals. The second pin holding portion 71C extends in the arrangement direction D4 from the base 71A, and holds the connection pin 73 (for example, the second connection pin 73Y).

Figure 7:
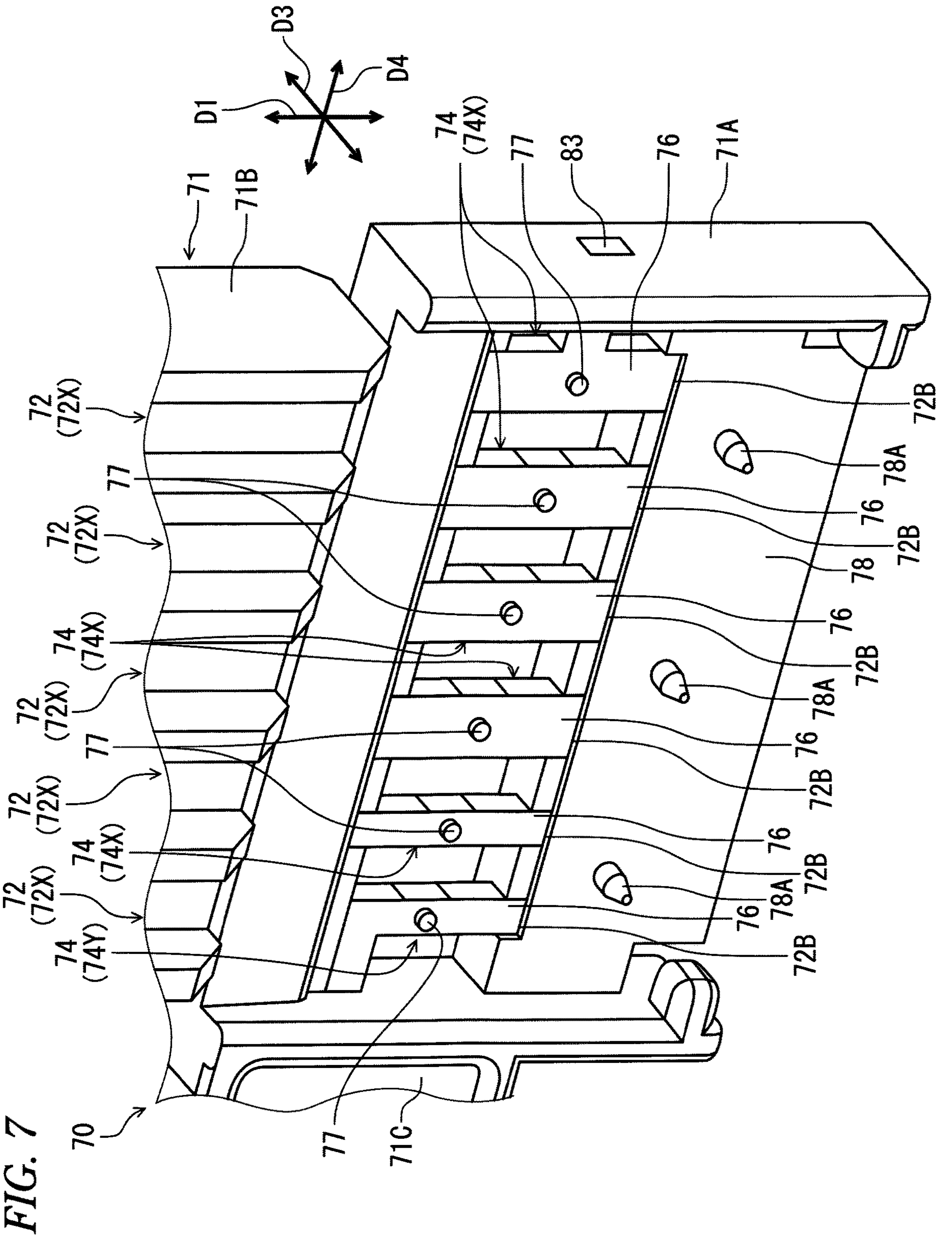
FIG. 7 is a partial perspective view of the lead block illustrated in FIG. 3.
Figure 8:
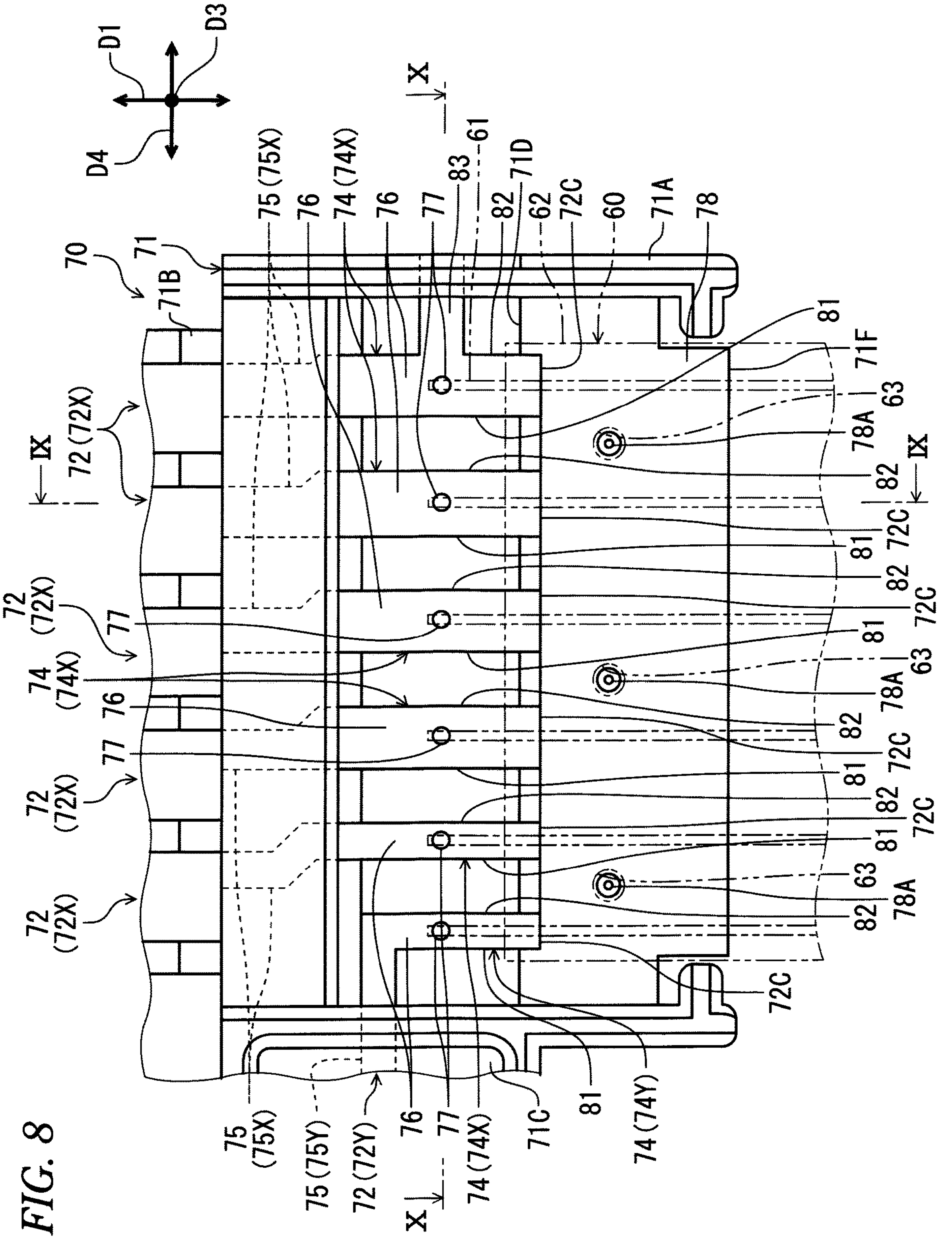
FIG. 8 is a partial side view of the lead block illustrated in FIG. 3.

As illustrated in FIGS. 7 and 8, at least one of the plurality of conductor connecting portions 74 includes an exposed surface 76 and a connection projection 77. The exposed surface 76 faces a perpendicular direction D3 perpendicular to the longitudinal direction D1 and the arrangement direction D4. The connection projection 77 protrudes from the exposed surface 76 in the perpendicular direction D3 and is configured to be connected to the conductor 61 (see FIG. 8) of the electrical cable 60.

In the present embodiment, each of the plurality of conductor connecting portions 74 includes the exposed surface 76 and the connection projection 77. However, the total number of the conductor connecting portions 74 including the exposed surfaces 76 and the connection projections 77 is not limited to that of the present embodiment.

As illustrated in FIG. 8, the electrical cable 60 is electrically connected to the connection projections 77 of the lead block 70. The electrical cable 60 includes a plurality of conductors 61 and an electrically insulating cover 62. The electrically insulating cover 62 includes an electrically insulating material, and partially covers the plurality of conductors 61. The plurality of conductors 61 are insulated by the electrically insulating cover 62. An end portion of the conductor 61 is exposed from the electrically insulating cover 62 and fixed to the connection projection 77. For example, the plurality of conductors 61 of the electrical cable 60 are fixed to the plurality of connection projections 77 by welding (for example, resistance welding). However, the fixing structure between the connection projections 77 and the conductors 61 of the electrical cable 60 is not limited to welding.

Figure 9:
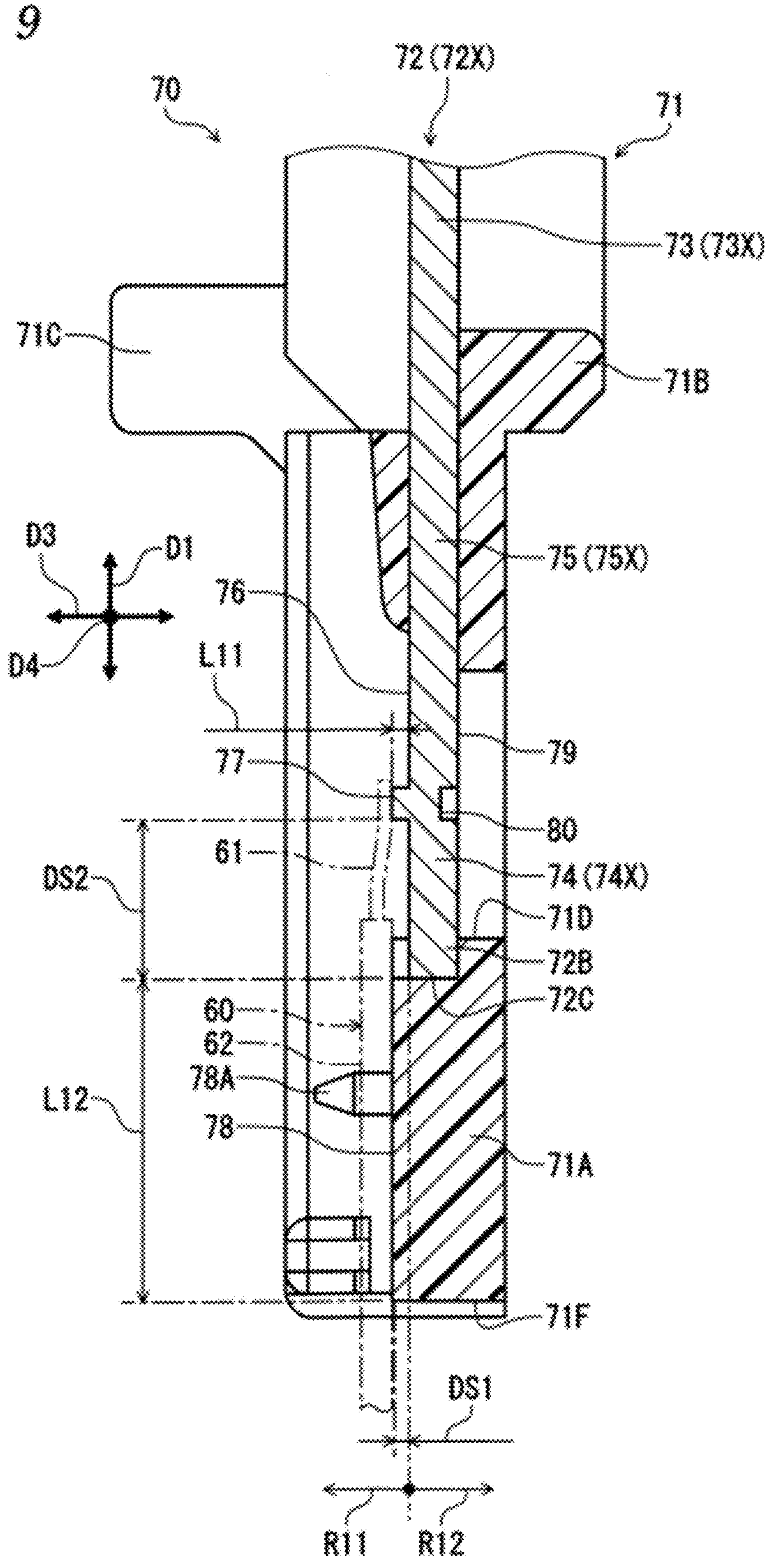
FIG. 9 is a cross-sectional view of the lead block taken along a line IX-IX of FIG. 8.

As illustrated in FIG. 9, the lead block body 71 includes a cable-facing surface 78. The cable-facing surface 78 is provided facing the electrical cable 60 in a state where the connection projection 77 is connected to the conductor 61 of the electrical cable 60.

The connection projection 77 is disposed in a first region R11 with respect to the exposed surface 76 in the perpendicular direction D3. The cable-facing surface 78 is offset in the perpendicular direction D3 from the exposed surface 76 and is disposed in the first region R11 with respect to the exposed surface 76.

The connection projection 77 has a first length L11 defined in the perpendicular direction D3 from the exposed surface 76. The cable-facing surface 78 is offset in the perpendicular direction D3 from the exposed surface 76 by a first distance DS1. The first length L11 is equal to or greater than the first distance DS1. In the present embodiment, the first length L11 is equal to the first distance DS1. However, the first length L11 may be longer or shorter than the first distance DS1.

The cable-facing surface 78 has a second length L12 defined in the longitudinal direction D1. The cable-facing surface 78 is disposed at an interval of a second distance DS2 from the connection projection 77 in the longitudinal direction D1. The second distance DS2 is equal to or less than the second length L12. In the present embodiment, the second distance DS2 is shorter than the second length L12. However, the second distance DS2 may be equal to or greater than the second length L12.

The second length L12 is longer than at least one of the first length L11 and the first distance DS1. In the present embodiment, the second length L12 is longer than the first length L11 and the first distance DS1. However, the second length L12 may be equal to or less than at least one of the first length L11 and the first distance DS1.

As illustrated in FIG. 7, the lead block body 71 includes a cable support projection 78A protruding in the perpendicular direction D3 from the cable-facing surface 78. The cable support projection 78A is offset from the connection projection 77 in the arrangement direction D4. In the present embodiment, the lead block body 71 includes a plurality of the cable support projections 78A. However, the total number of the cable support projections 78A is not limited to that of the present embodiment.

Figure 10:
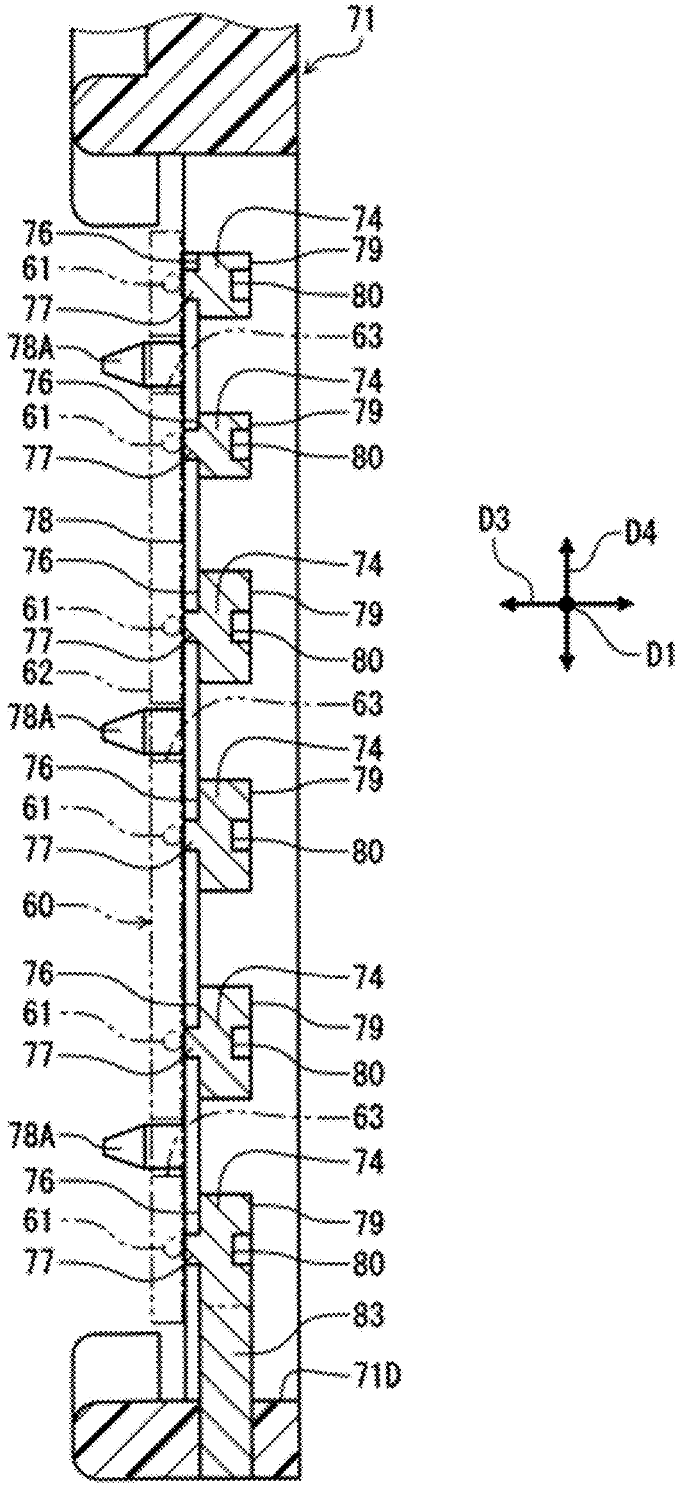
FIG. 10 is a cross-sectional view of the lead block taken along a line X-X of FIG. 8.

As illustrated in FIG. 10, the electrical cable 60 includes a plurality of support holes 63. The cable support projections 78A are provided in the support holes 63 in a state where the electrical cable 60 is electrically connected to the connection projections 77. The cable support projections 78A stabilize the position of the electrical cable 60 with respect to the lead block body 71 in the longitudinal direction D1 and the arrangement direction D4 in a state where the electrical cable 60 is electrically connected to the connection projections 77. Note that the cable support projections 78A and the support holes 63 may be omitted from the lead block 70.

At least one of the plurality of conductor connecting portions 74 includes a back surface 79 and a recess 80. The back surface 79 is provided on a back side of the exposed surface 76. The recess 80 is provided in the back surface 79 and is disposed at a position corresponding to that of the connection projection 77 in the longitudinal direction D1. The back surface 79 and the recess 80 are disposed in a second region R12 with respect to the exposed surface 76 in the perpendicular direction D3. The second region R12 is defined on an opposite side of the first region R11 with respect to the exposed surface 76 in the perpendicular direction D3.

In the present embodiment, each of the plurality of conductor connecting portions 74 includes the back surface 79 and the recess 80. The connection projections 77 and the recesses 80 are formed by, for example, press machining. However, the total number of the conductor connecting portions 74 including the back surface 79 and the recess 80 is not limited to that of the present embodiment. The connection projections 77 and the recesses 80 may be formed by a method other than press machining. The recesses 80 may be omitted from the conductor connecting portion 74.

As illustrated in FIG. 3, the plurality of connection pins 73 are disposed in a first longitudinal region R21 with respect to the connection projections 77 in the longitudinal direction D1. The cable-facing surface 78 is disposed in a second longitudinal region R22 with respect to the connection projections 77 in the longitudinal direction D1. The first longitudinal ends 72A are disposed in the first longitudinal region R21. The second longitudinal ends 72B are disposed in the second longitudinal region R22. The second longitudinal region R22 is defined on an opposite side of the first longitudinal region R21 with respect to the connection projection 77 in the longitudinal direction D1.

The lead block body 71 includes a first block end 71E and a second block end 71F. The lead block body 71 extends in the longitudinal direction D1 from the first block end 71E to the second block end 71F. The first block end 71E is disposed in the first longitudinal region R21. The second block end 71F is disposed in the second longitudinal region R22.

As illustrated in FIGS. 6, 7 and 9, the second longitudinal ends 72B is at least partially provided in the lead block body 71. As illustrated in FIG. 9, the second longitudinal end 72B includes an end face 72C facing the longitudinal direction D1. The end face 72C of the second longitudinal end 72B is entirely covered by the lead block body 71. As illustrated in FIG. 9, the end face 72C of the second longitudinal end 72B is disposed between the connection projection 77 and the second block end 71F of the lead block body 71 in the longitudinal direction D1 when viewed along the perpendicular direction D3. However, the end face 72C of the second longitudinal end 72B may be at least partially exposed from the lead block body 71. The end face 72C of the second longitudinal end 72B may be disposed at the same position as that of the second block end 71F of the lead block body 71 in the longitudinal direction D1 when viewed along the perpendicular direction D3, or may be disposed at a position farther from the connection projection 77 than the second block end 71F of the lead block body 71 is in the longitudinal direction D1 when viewed along the perpendicular direction D3.

As illustrated in FIGS. 6, 7 and 9, in the present embodiment, the second longitudinal end 72B is partially provided in the lead block body 71. Specifically, a portion of the exposed surface 76 is provided on the second longitudinal end 72B. The exposed surface 76 is exposed from the lead block body 71, and is not provided in the lead block body 71. A portion of the second longitudinal end 72B other than the exposed surface 76 is embedded in the lead block body 71 and is covered by the lead block body 71. However, the second longitudinal end 72B including a portion of the exposed surface 76 may be entirely provided in the lead block body 71.

As illustrated in FIGS. 8 and 9, the cable-facing surface 78 is provided without overlapping the plurality of bus bars 72 when viewed along the perpendicular direction D3. The cable-facing surface 78 is provided without overlapping the plurality of second longitudinal ends 72B when viewed along the perpendicular direction D3. However, the cable-facing surface 78 may overlap the plurality of bus bars 72 when viewed along the perpendicular direction D3. The cable-facing surface 78 may overlap the plurality of second longitudinal ends 72B when viewed along the perpendicular direction D3.

As illustrated in FIG. 8, each of the plurality of conductor connecting portions 74 includes a first surface 81 and a second surface 82. The first surface 81 and the second surface 82 face the arrangement direction D4. The second surface 82 is disposed on a back side of the first surface 81 in the arrangement direction D4.

One of the plurality of bus bars 72 includes a protruding portion 83 protruding in the arrangement direction D4 from the second surface 82 of the conductor connecting portion 74. The protruding portion 83 is at least partially embedded in the lead block body 71. In the present embodiment, the protruding portion 83 is partially embedded in the lead block body 71. However, the protruding portion 83 may be entirely embedded in the lead block body 71. Additionally, the protruding portion 83 may be omitted from the bus bar 72.

The lead block body 71 includes an opening 71D. The plurality of conductor connecting portions 74 are at least partially disposed in the opening 71D when viewed along the perpendicular direction D3. In the present embodiment, the plurality of conductor connecting portions 74 are entirely disposed in the opening 71D when viewed along the perpendicular direction D3. However, the plurality of conductor connecting portions 74 may be partially disposed in the opening 71D when viewed along the perpendicular direction D3.

Figure 11:
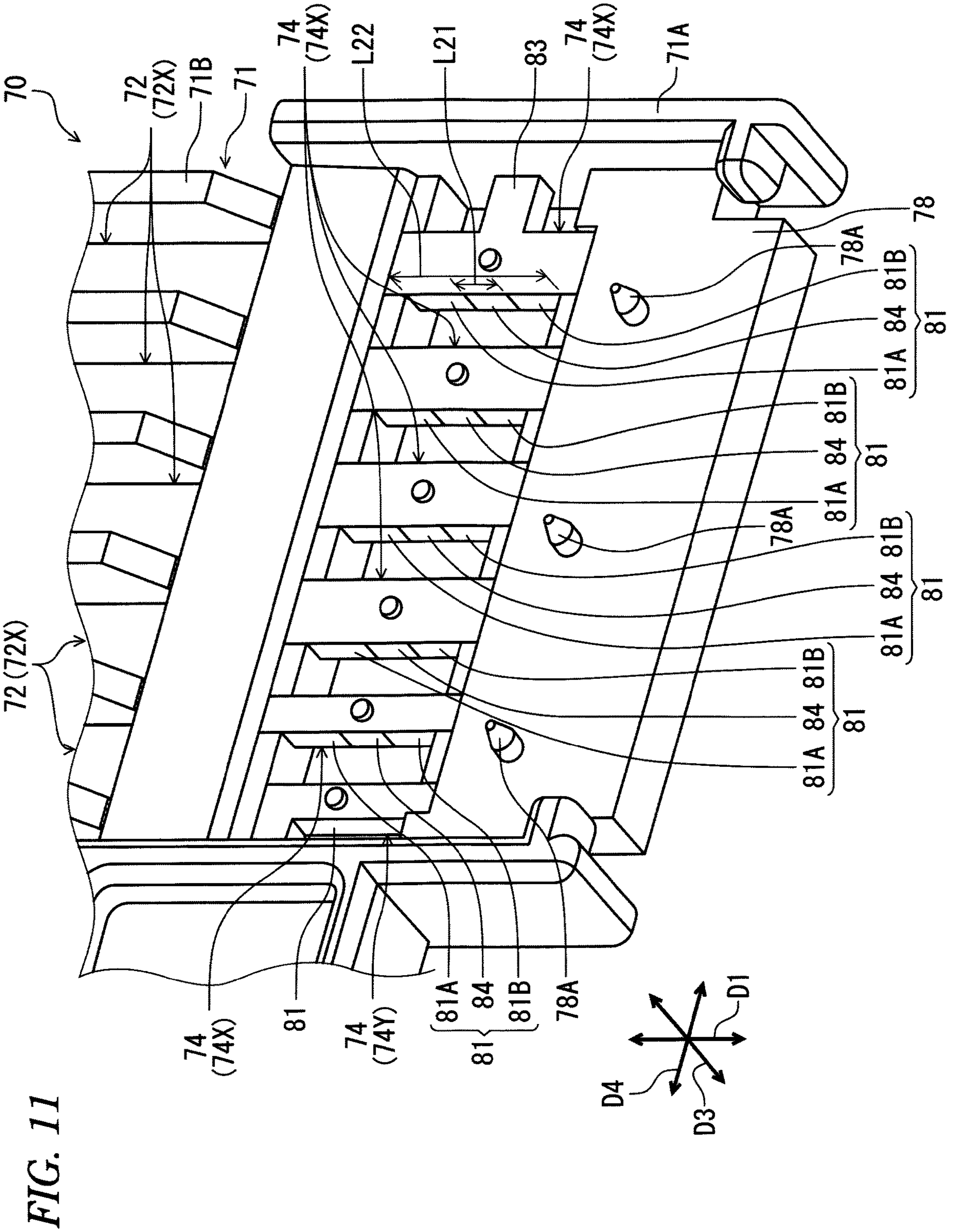
FIG. 11 is a partial side view of the lead block illustrated in FIG. 3.

As illustrated in FIG. 11, the first surface 81 includes a first cut surface 84 having an area smaller than an area of the first surface 81. The first cut surface 84 is disposed in the opening 71D. A length L21 of the first cut surface 84 in the longitudinal direction D1 is shorter than a length L22 of the first surface 81 in the longitudinal direction D1. The first surface 81 includes a first adjacent surface 81A adjacent to the first cut surface 84. The first surface 81 includes a first adjacent surface 81B adjacent to the first cut surface 84. An appearance of the first cut surface 84 is different from an appearance of the first adjacent surface 81A. The appearance of the first cut surface 84 is different from an appearance of the first adjacent surface 81B. The appearance of the first adjacent surface 81A is the same as the appearance of the first adjacent surface 81B.

As described below, the first cut surface 84 is a surface formed when a coupling bar 104 (see FIGS. 15 and 16) is cut from the plurality of conductor connecting portions 74 during manufacture of the lead block 70. The first adjacent surfaces 81A and 81B are surfaces formed by, for example, press machining (e.g., shearing), whereas the first cut surface 84 is a surface formed in a step different from that for the first adjacent surfaces 81A and 81B after the first adjacent surfaces 81A and 81B. The first cut surface 84 is, for example, a surface formed by press machining (e.g., shearing) as in the first adjacent surfaces 81A and 81B.

Figure 12:
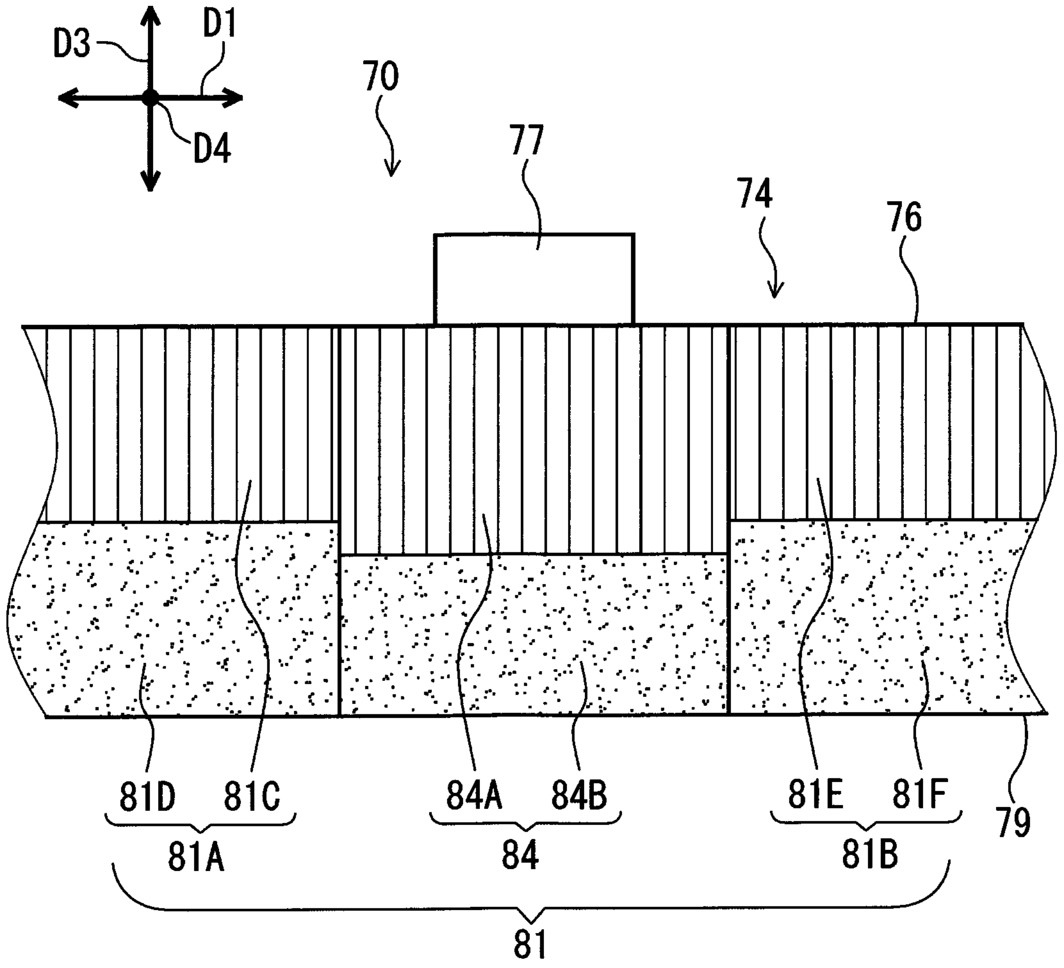
FIG. 12 is a partial enlarged view of a conductor connecting portion of the lead block illustrated in FIG. 3.

As illustrated in FIG. 12, the first adjacent surface 81A includes a first shear surface 81C and a first fracture surface 81D. The first fracture surface 81D is adjacent to the first shear surface 81C in the perpendicular direction D3. The first shear surface 81C is a surface formed during shearing by shearing of a material using a punch and a die, and includes a plurality of streaks extending in one direction (e.g., the perpendicular direction D3). The first fracture surface 81D is a surface formed during shearing by fracturing of the material after shearing of a portion of the material using the punch and die, and includes fine recesses and protrusions. Therefore, an appearance of the first shear surface 81C is different from an appearance of the first fracture surface 81D.

Similarly, the first adjacent surface 81B includes a first shear surface 81E and a first fracture surface 81F. The first fracture surface 81F is adjacent to the first shear surface 81E in the perpendicular direction D3. The first shear surface 81E is a surface formed during shearing by shearing of the material using the punch and die, and includes a plurality of streaks extending in one direction (e.g., the perpendicular direction D3). The first fracture surface 81F is a surface formed during shearing by fracturing of the material after shearing of a portion of the material using the punch and die, and includes fine recesses and protrusions. Therefore, an appearance of the first shear surface 81E is different from an appearance of the first fracture surface 81F.

The first cut surface 84 includes a first shear surface 84A and a first fracture surface 84B. The first fracture surface 84B is adjacent to the first shear surface 84A in the perpendicular direction D3. The first shear surface 84A is a surface formed during shearing by shearing of the material using the punch and die, and includes a plurality of streaks extending in one direction (e.g., the perpendicular direction D3). The first fracture surface 84B is a surface formed during shearing by fracturing of the material after shearing of a portion of the material using the punch and die, and includes fine recesses and protrusions. Therefore, an appearance of the first shear surface 84A is different from an appearance of the first fracture surface 84B.

A length of the first shear surface 84A in the perpendicular direction D3 is different from lengths of the first shear surfaces 81C and 81E in the perpendicular direction D3. A length of the first fracture surface 84B in the perpendicular direction D3 is different from lengths of the first fracture surfaces 81D and 81F in the perpendicular direction D3. Therefore, the appearance of the first cut surface 84 is different from the appearances of the first adjacent surfaces 81A and 81B. Note that the first cut surface 84 may be a surface subjected to surface finishing after the coupling bar 104 is cut from the plurality of conductor connecting portions 74. Similarly, the first adjacent surfaces 81A and 81B may be surfaces subjected to surface finishing. In a case where the first cut surface 84 is subjected to surface finishing, the first shear surface 84A and the first fracture surface 84B are at least partially replaced with finished surfaces. In a case where the first adjacent surface 81A is subjected to surface finishing, the first shear surface 81C and the first fracture surface 81D are at least partially replaced with finished surfaces. In a case where the first adjacent surface 81B is subjected to surface finishing, the first shear surface 81E and the first fracture surface 81F are at least partially replaced with finished surfaces. Therefore, the appearance of the first cut surface 84 may be the same as the appearances of the first adjacent surfaces 81A and 81B.

Figure 13:
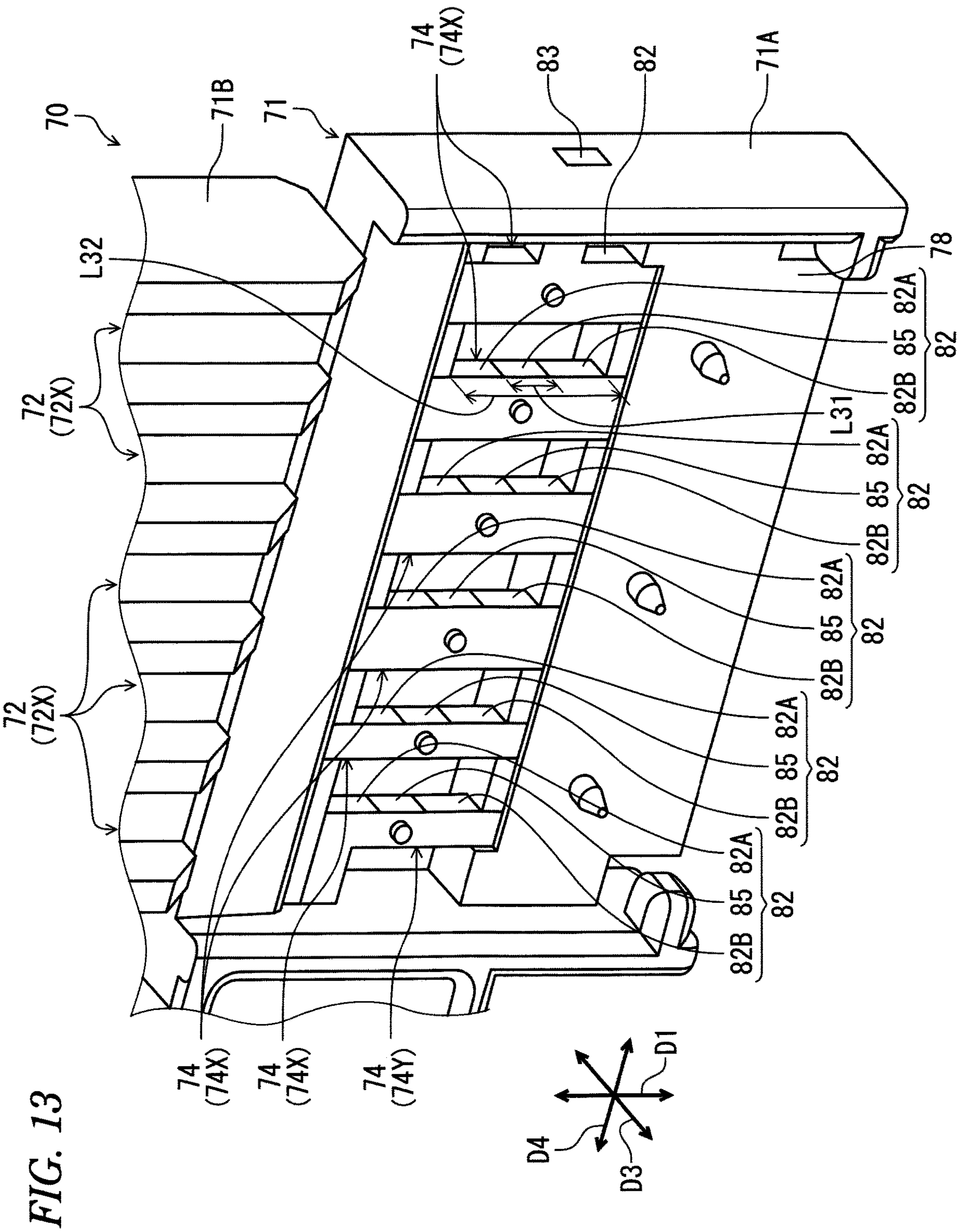
FIG. 13 is a partial side view of the lead block illustrated in FIG. 3.

As illustrated in FIG. 13, the second surface 82 includes a second cut surface 85 having an area smaller than an area of the second surface 82. The second cut surface 85 is disposed in the opening 71D. A length L31 of the second cut surface 85 in the longitudinal direction D1 is shorter than a length L32 of the second surface 82 in the longitudinal direction D1. The second surface 82 includes a second adjacent surface 82A adjacent to the second cut surface 85. The second surface 82 includes a second adjacent surface 82B adjacent to the second cut surface 85. An appearance of the second cut surface 85 is different from an appearance of the second adjacent surface 82A. The appearance of the second cut surface 85 is different from an appearance of the second adjacent surface 82B. The appearance of the second adjacent surface 82A is the same as the appearance of the second adjacent surface 82B.

The second cut surface 85 is disposed on a back side of the first cut surface 84 (see FIG. 11) in the arrangement direction D4. The second cut surface 85 is disposed at the same position as that of the first cut surface 84 (see FIG. 11) in the longitudinal direction D1. However, the second cut surface 85 need not be disposed on the back side of the first cut surface 84 (see FIG. 11) in the arrangement direction D4. The second cut surface 85 may be offset from the first cut surface 84 (see FIG. 11) in the longitudinal direction D1.

As described below, the second cut surface 85 is a surface formed when the coupling bar 104 (see FIGS. 15 and 16) is cut from the plurality of conductor connecting portions 74 during manufacture of the lead block 70. The second adjacent surfaces 82A and 82B are surfaces formed by, for example, press machining (e.g., shearing), whereas the second cut surface 85 is a surface formed in a step different from that for the second adjacent surfaces 82A and 82B after the second adjacent surfaces 82A and 82B. The second cut surface 85 is, for example, a surface formed by press machining (e.g., shearing) as in the second adjacent surfaces 82A and 82B.

Figure 14:
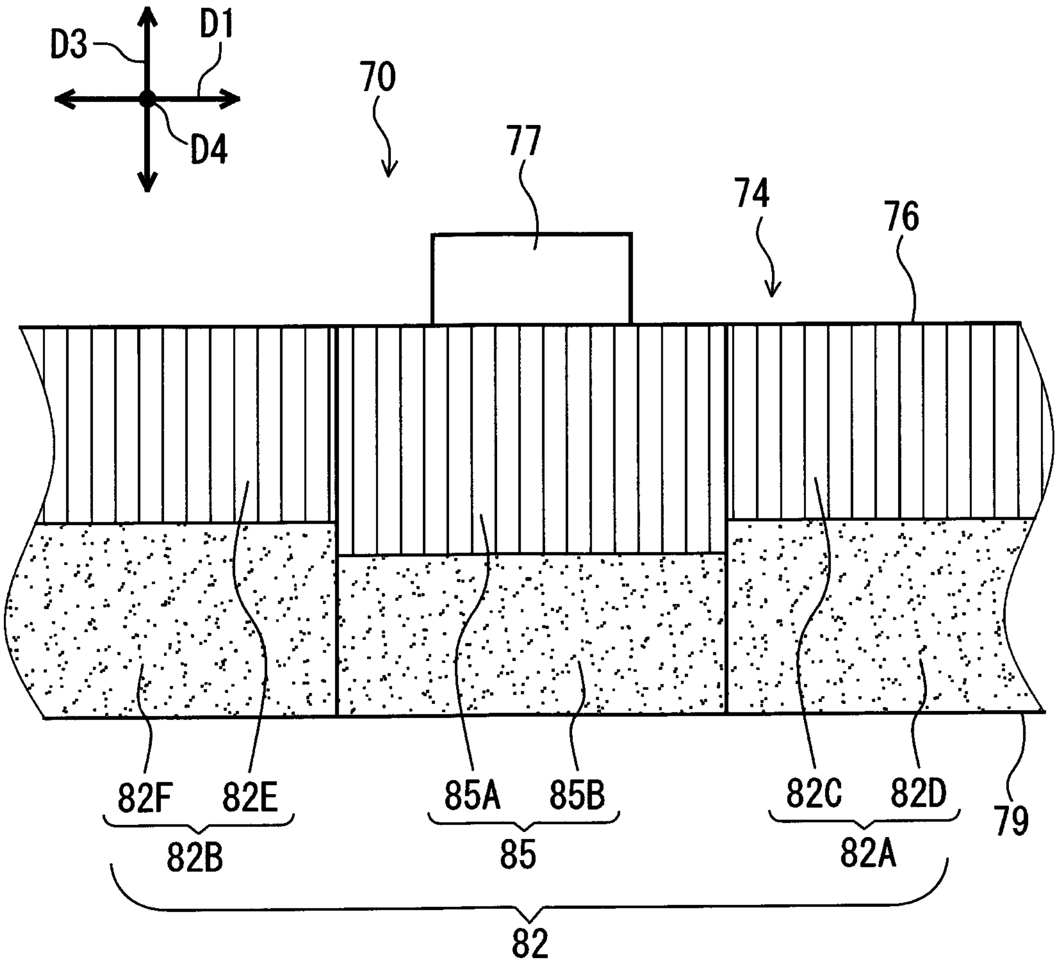
FIG. 14 is a partial enlarged view of the conductor connecting portion of the lead block illustrated in FIG. 3.

As illustrated in FIG. 14, the second adjacent surface 82A includes a second shear surface 82C and a second fracture surface 82D. The second fracture surface 82D is adjacent to the second shear surface 82C in the perpendicular direction D3. The second shear surface 82C is a surface formed during shearing by shearing of the material using the punch and die, and includes a plurality of streaks extending in one direction (e.g., the perpendicular direction D3). The second fracture surface 82D is a surface formed during shearing by fracturing of the material after shearing of a portion of the material using the punch and die, and includes fine recesses and protrusions. Therefore, an appearance of the second shear surface 82C is different from an appearance of the second fracture surface 82D.

Similarly, the second adjacent surface 82B includes a second shear surface 82E and a second fracture surface 82F. The second fracture surface 82F is adjacent to the second shear surface 82E in the perpendicular direction D3. The second shear surface 82E is a surface formed during shearing by shearing of the material using the punch and die, and includes a plurality of streaks extending in one direction (e.g., the perpendicular direction D3). The second fracture surface 82F is a surface formed during shearing by fracturing of the material after shearing of a portion of the material using the punch and die, and includes fine recesses and protrusions. Therefore, an appearance of the second shear surface 82E is different from an appearance of the second fracture surface 82F.

The second cut surface 85 includes a second shear surface 85A and a second fracture surface 85B. The second fracture surface 85B is adjacent to the second shear surface 85A in the perpendicular direction D3. The second shear surface 85A is a surface formed during shearing by shearing of the material using the punch and die, and includes a plurality of streaks extending in one direction (e.g., the perpendicular direction D3). The second fracture surface 85B is a surface formed during shearing by fracturing of the material after shearing of a portion of the material using the punch and die, and includes fine recesses and protrusions. Therefore, an appearance of the second shear surface 85A is different from an appearance of the second fracture surface 85B.

A length of the second shear surface 85A in the perpendicular direction D3 is different from lengths of the second shear surfaces 82C and 82E in the perpendicular direction D3. A length of the second fracture surface 85B in the perpendicular direction D3 is different from lengths of the second fracture surfaces 82D and 82F in the perpendicular direction D3. Therefore, the appearance of the second cut surface 85 is different from the appearances of the second adjacent surfaces 82A and 82B. Note that the second cut surface 85 may be a surface subjected to surface finishing after the coupling bar 104 is cut from the plurality of conductor connecting portions 74. Similarly, the second adjacent surfaces 82A and 81B may be surfaces subjected to surface finishing. In a case where the second cut surface 85 is subjected to surface finishing, the second shear surface 85A and the second fracture surface 85B are at least partially replaced with finished surfaces. In a case where the second adjacent surface 82A is subjected to surface finishing, the second shear surface 82C and the second fracture surface 82D are at least partially replaced with finished surfaces. In a case where the second adjacent surface 82B is subjected to surface finishing, the second shear surface 82E and the second fracture surface 82F are at least partially replaced with finished surfaces. Therefore, the appearance of the second cut surface 85 may be the same as the appearances of the second adjacent surfaces 82A and 82B.

A method of manufacturing the lead block 70 will be described with reference to FIGS. 3 and 10 to 16.

Figure 15:
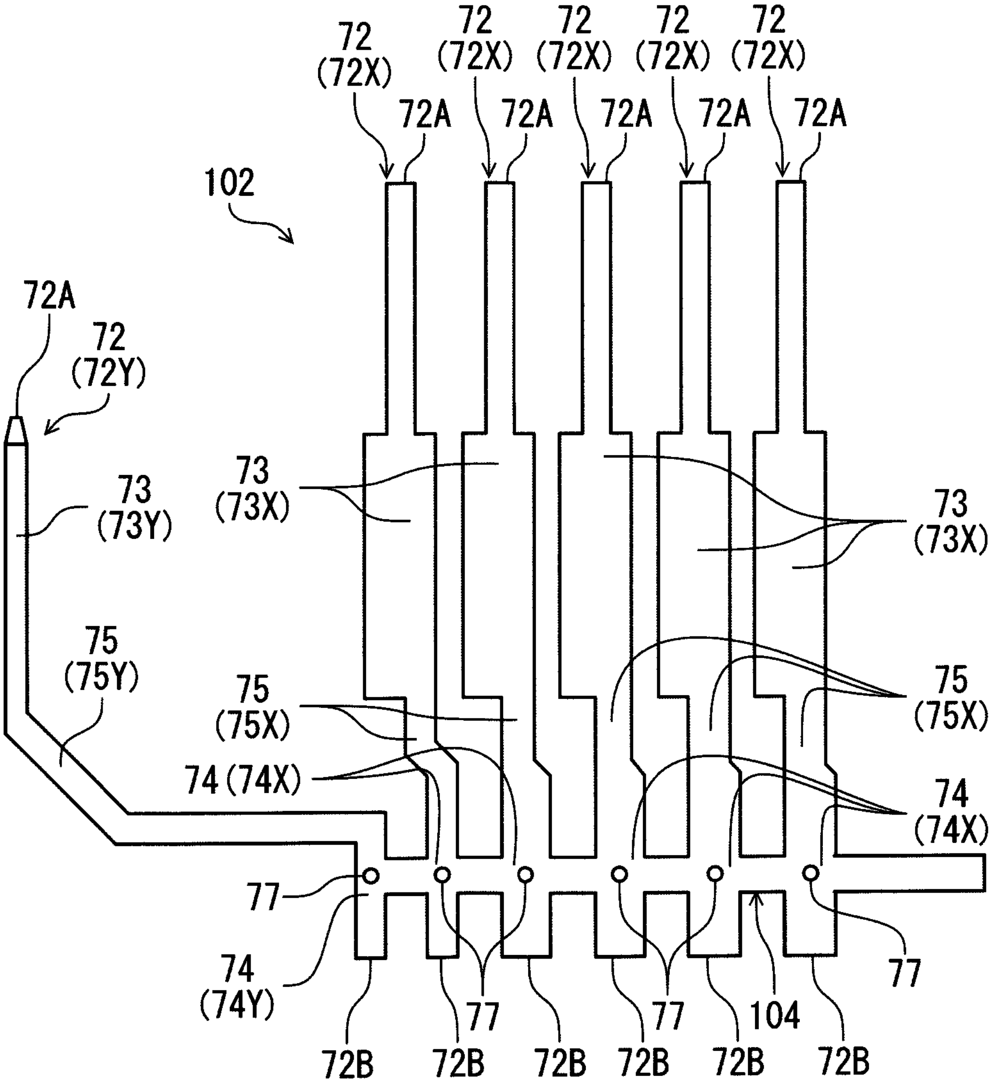
FIG. 15 is a plan view illustrating a press machining step for the lead block illustrated in FIG. 3.

As illustrated in FIG. 15, in the press machining step, a bus bar plate 102 is formed from a plate including a conductive material by press machining. The bus bar plate 102 includes the plurality of bus bars 72, and the coupling bar 104 coupling the plurality of conductor connecting portions 74 of the plurality of bus bars 72 to each other. When the bus bar plate 102 is formed by press machining, the plurality of connection projections 77 and the plurality of recesses 80 (see FIG. 10) are formed in the bus bar plate 102 by press machining. Note that, in addition to the coupling bar 104, the bus bar plate 102 may include a carrier coupling the plurality of bus bars 72 to each other.

Figure 16:
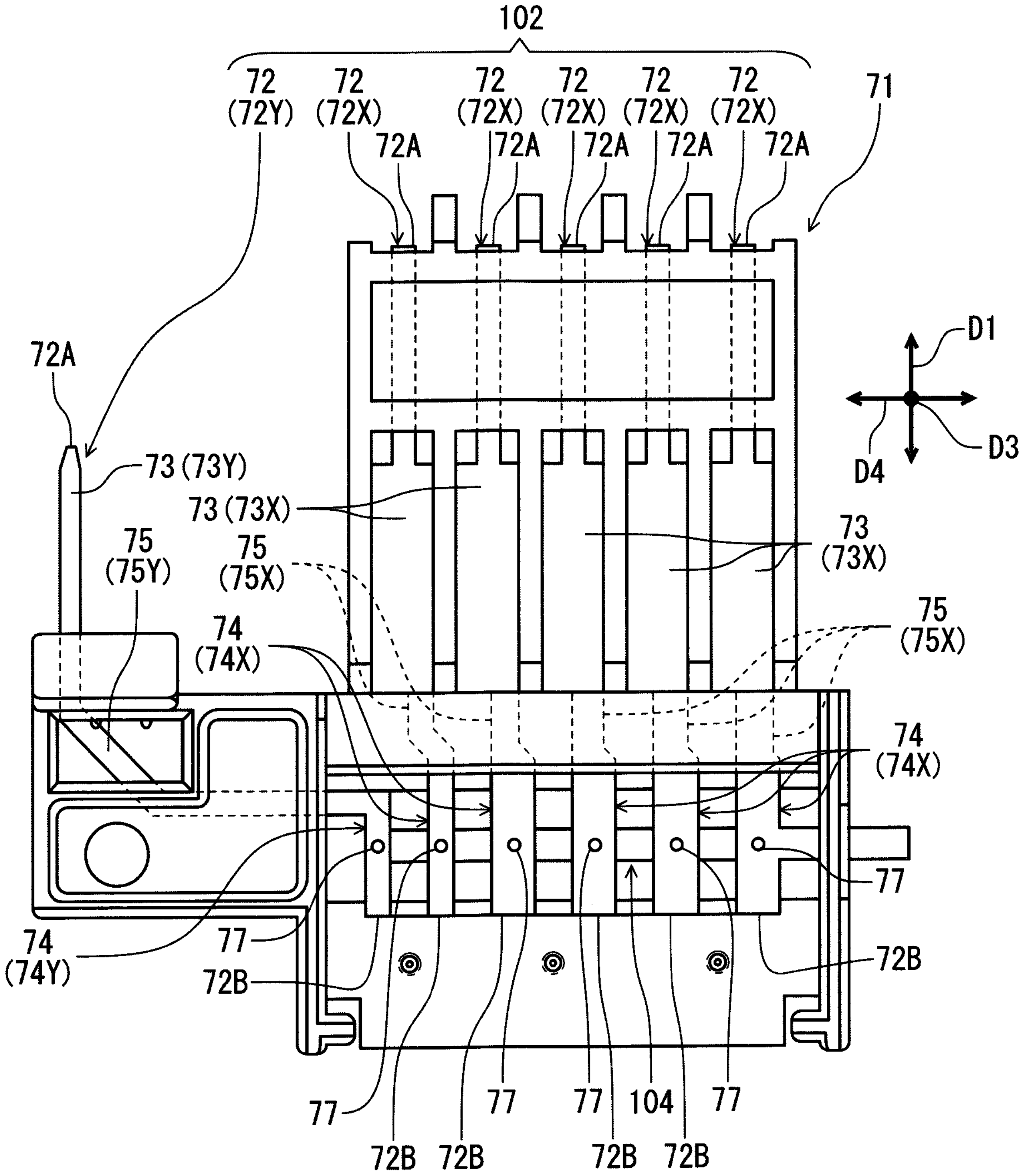
FIG. 16 is a plan view illustrating a molding step for the lead block illustrated in FIG. 3.

As illustrated in FIG. 16, in a molding step, the bus bar plate 102 is embedded in the lead block body 71 by insertion molding with the plurality of conductor connecting portions 74 exposed from the lead block body 71. At this time, the bus bar plate 102 is embedded in the lead block body 71 by insertion molding with the plurality of conductor connecting portions 74 and at least a portion of the coupling bar 104 being disposed in the opening 71D of the lead block body 71.

In a cutting step, the coupling bar 104 is cut from the plurality of conductor connecting portions 74. In the cutting step, the coupling bar 104 is cut from the plurality of conductor connecting portions 74 via the opening 71D of the lead block body 71. For example, in the cutting step, the coupling bar 104 is cut from the plurality of conductor connecting portions 74 by press machining. Thereby, the lead block 70 illustrated in FIG. 3 is obtained from the bus bar plate 102 and the lead block body 71 illustrated in FIG. 16.

As illustrated in FIGS. 11 to 14, when the coupling bar 104 is cut from the plurality of conductor connecting portions 74, a plurality of the first cut surfaces 84 (see FIGS. 11 and 12) and a plurality of the second cut surfaces 85 (see FIGS. 13 and 14) are formed.

Note that when the coupling bar 104 is cut from the plurality of conductor connecting portions 74, a plurality of connection projections 77 and a plurality of recesses 80 (see FIG. 10) may be formed by press machining. The method of manufacturing the lead block 70 is not limited to the method of manufacturing described above.

As illustrated in FIGS. 3 and 9, the lead block 70 includes the lead block body 71 and the plurality of bus bars 72. The lead block body 71 includes an electrically insulating material. The plurality of bus bars 72 are partially provided in the lead block body 71 and include a conductive material. The plurality of bus bars 72 include the plurality of connection pins 73 and the plurality of conductor connecting portions 74. The plurality of connection pins 73 are exposed from the lead block body 71 and are electrically connectable to the connector of the external electrical cable 60. The plurality of conductor connecting portions 74 are exposed from the lead block body 71 and is configured to be electrically connected to the plurality of conductors 61 of the electrical cable 60, respectively. The plurality of conductor connecting portions 74 each extend in a longitudinal direction D1, and are disposed at intervals in an arrangement direction D4 perpendicular to the longitudinal direction D1. At least one of the plurality of conductor connecting portions 74 includes the exposed surface 76 and the connection projection 77. The exposed surface 76 faces the perpendicular direction D3 perpendicular to the longitudinal direction D1 and the arrangement direction D4. The connection projection 77 protrudes from the exposed surface 76 in the perpendicular direction D3 and is configured to be connected to the conductor 61 of the electrical cable 60. The connection projection 77 is disposed in the first region R11 with respect to the exposed surface 76 in the perpendicular direction D3. The lead block body 71 includes the cable-facing surface 78 provided facing the electrical cable 60 in a state where the connection projection 77 is connected to the conductor 61 of the electrical cable 60. The cable-facing surface 78 is offset in the perpendicular direction D3 from the exposed surface 76 and is disposed in the first region R11 with respect to the exposed surface 76.

With the lead block 70, the connection projection 77 protrudes from the exposed surface 76 in the perpendicular direction D3, is configured to be connected to the conductor 61 of the electrical cable 60, and is disposed in the first region R11 with respect to the exposed surface 76 in the perpendicular direction D3. The cable-facing surface 78 is provided facing the electrical cable 60 in a state where the connection projection 77 is connected to the conductor 61 of the electrical cable 60. Further, the cable-facing surface 78 is offset in the perpendicular direction D3 from the exposed surface 76, and is disposed in the first region R11 with respect to the exposed surface 76. In the state where the connection projection 77 is connected to the conductor 61 of the electrical cable 60, it is easy to secure a distance between the conductor 61 of the electrical cable 60 and the exposed surface 76. Therefore, when a connection portion between the bus bar 72 and the conductor 61 of the electrical cable 60 is disconnected due to an action of an external force or the like, it is possible to reduce contact of the disconnected conductor 61 with the bus bar 72 that does not correspond to the disconnected conductor 61, and thus the safety of the lead block 70 can be enhanced.

According to a first aspect, a lead block includes a lead block body and a plurality of bus bars. The lead block body includes an electrically insulating material. The plurality of bus bars are partially provided in the lead block body and include a conductive material. The plurality of bus bars include a plurality of connection pins and a plurality of conductor connecting portions. The plurality of connection pins are exposed from the lead block body and are electrically connectable to a connector of an external electrical cable. The plurality of conductor connecting portions are exposed from the lead block body and configured to be electrically connected to a plurality of conductors of an electrical cable, respectively. The plurality of conductor connecting portions each extend in a longitudinal direction and are disposed at intervals in an arrangement direction perpendicular to the longitudinal direction. At least one of the plurality of conductor connecting portions includes an exposed surface and a connection projection. The exposed surface faces a perpendicular direction perpendicular to the longitudinal direction and the arrangement direction. The connection projection protrudes from the exposed surface in the perpendicular direction and is configured to be connected to a conductor of the plurality of conductors of the electrical cable. The connection projection is disposed in a first region with respect to the exposed surface in the perpendicular direction. The lead block body includes a cable-facing surface provided facing the electrical cable in a state where the connection projection is connected to the conductor of the electrical cable. The cable-facing surface is offset in the perpendicular direction from the exposed surface and is disposed in the first region with respect to the exposed surface.

With the lead block according to the first aspect, the connection projection protrudes from the exposed surface in the perpendicular direction, is configured to be connected to the conductor of the electrical cable, and is disposed in the first region with respect to the exposed surface in the perpendicular direction. The cable-facing surface is provided facing the electrical cable in a state where the connection projection is connected to the conductor of the electrical cable. Further, the cable-facing surface is offset in the perpendicular direction from the exposed surface, and is disposed in the first region with respect to the exposed surface. In the state where the connection projection is connected to the conductor of the electrical cable, it is easy to secure a distance between the conductor of the electrical cable and the exposed surface. Therefore, when a connection portion between the bus bar and the conductor of the electrical cable is disconnected due to an action of an external force or the like, it is possible to reduce contact of the disconnected conductor with the bus bar that does not correspond to the disconnected conductor, and thus the safety of the lead block can be enhanced.

According to a second aspect, in the lead block according to the first aspect, the connection projection has a first length defined in the perpendicular direction from the exposed surface. The cable-facing surface is offset in the perpendicular direction from the exposed surface by a first distance. The first length is equal to or greater than the first distance.

With the lead block according to the second aspect, it is possible to reliably reduce contact of the disconnected conductor with the bus bar that does not correspond to the disconnected conductor, and thus the safety of the lead block can be reliably enhanced.

According to a third aspect, in the lead block according to the second aspect, the cable-facing surface has a second length defined in the longitudinal direction. The cable-facing surface is disposed at an interval of a second distance from the connection projection in the longitudinal direction. The second distance is equal to or less than the second length.

With the lead block according to the third aspect, since the second distance can be made relatively short, it is possible to reliably reduce contact of the disconnected conductor with the bus bar that does not correspond to the disconnected conductor, and thus the safety of the lead block can be reliably enhanced.

According to a fourth aspect, in the lead block according to any one of the first to third aspects, the plurality of connection pins are disposed in a first longitudinal region with respect to the connection projection in the longitudinal direction. The cable-facing surface is disposed in a second longitudinal region with respect to the connection projection in the longitudinal direction. The second longitudinal region is defined on an opposite side of the first longitudinal region with respect to the connection projection in the longitudinal direction.

With the lead block according to the fourth aspect, it is possible to reliably reduce contact of the conductor of the electrical cable with the exposed surface by the cable-facing surface in a state where the connection projection is connected to the electrical cable.

According to a fifth aspect, in the lead block according to any one of the first to fourth aspects, the at least one of the plurality of conductor connecting portions includes a back surface provided on a back side of the exposed surface, and a recess provided in the back surface and disposed at a position corresponding to that of the connection projection in the longitudinal direction.

With the lead block according to the fifth aspect, the connection projection and the recess can be formed in a processing step such as press machining.

According to a sixth aspect, in the lead block according to any one of the first to fifth aspects, the lead block body includes a cable support projection protruding in the perpendicular direction from the cable-facing surface.

With the lead block according to the sixth aspect, a position of the electrical cable with respect to the lead block body can be stabilized using the cable support projection. Thereby, it is possible to reliably reduce contact of the disconnected conductor with the bus bar that does not correspond to the disconnected conductor, and thus the safety of the lead block can be reliably enhanced.

According to a seventh aspect, in the lead block according to the sixth aspect, the cable support projection is offset from the connection projection in the arrangement direction.

With the lead block according to the seventh aspect, it is easy to dispose the cable support projection while avoiding the conductor of the electrical cable.

According to an eighth aspect, in the lead block according to any one of the first to seventh aspects, the plurality of bus bars include a plurality of intermediate portions provided between the plurality of connection pins and the plurality of conductor connecting portions and corresponding to the plurality of bus bars, respectively. The plurality of intermediate portions are at least partially provided in the lead block body.

With the lead block according to the eighth aspect, since the plurality of intermediate portions are at least partially provided in the lead block body, the plurality of bus bars can be held in a state of being spaced apart from each other, with the plurality of connection pins and the plurality of conductor connecting portions exposed from the lead block body.

According to a ninth aspect, in the lead block according to any one of the first to eighth aspects, each of the plurality of bus bars includes a first longitudinal end and a second longitudinal end. Each of the plurality of connection pins includes the first longitudinal end. Each of the plurality of conductor connecting portions includes the second longitudinal end. The second longitudinal end is at least partially provided in the lead block body.

With the lead block according to the ninth aspect, it is possible to reduce, by the lead block body, contact of the second longitudinal end with the electrical cable or another cable connected to the connection projection.

According to a tenth aspect, in the lead block according to the ninth aspect, the second longitudinal end includes an end face facing the longitudinal direction. The end face of the second longitudinal end is entirely covered by the lead block body.

With the lead block according to the tenth aspect, it is possible to reliably reduce, by the lead block body, contact of the second longitudinal end with the electrical cable or another cable connected to the connection projection.

According to an eleventh aspect, a rotary connector device includes a stator, a rotator, the lead block according to any one of the first to tenth aspects, and an electrical cable. The rotator is provided rotatably about a rotation axis with respect to the stator. The electrical cable is electrically connected to the connection projection of the lead block.

With the rotary connector device according to the eleventh aspect, since the lead block according to any one of the first to tenth aspects is included, when a connection portion between the bus bar and the conductor of the electrical cable is disconnected due to an action of an external force or the like, it is possible to reduce contact of the disconnected conductor with the bus bar that does not correspond to the disconnected conductor, and thus the safety of the rotary connector device can be enhanced.

In the present application, the term "comprise" and its derivatives are non-limiting terms for explaining the existence of a component, and the existence of other components not described is not excluded. This also applies to "have", "include", and their derivatives.

In the present application, ordinal numbers such as "first" and "second" are merely terms used to identify a configuration and do not have any other meaning (e.g., a specific order or the like). For example, the presence of a "first element" does not imply the presence of a "second element", and the presence of a "second element" does not imply the presence of a "first element".

Additionally, expressions such as "parallel", "orthogonal", and "identical" in the present disclosure should not be interpreted strictly and include respectively the meanings of "substantially parallel", "substantially orthogonal", and "substantially identical". In addition, other expressions related to the arrangement are not strictly construed.

The expression "at least one of A and B" in the present disclosure also includes, for example, all of (1) only A, (2) only B, and (3) both A and B. The expression "at least one of A, B and C" includes, for example, all of (1) only A, (2) only B, (3) only C, (4) A and B, (5) B and C, (6) A and C, and (7) A, B and C. In the present disclosure, the expression "at least one of A and B" is not construed as "at least one of A and at least one of B".

It is apparent from the above disclosure that various changes and modifications of the disclosure are possible. Accordingly, the disclosure may be implemented in a manner different from the specific disclosure of the present application without departing from the spirit of the disclosure.

What is claimed is:

1. A lead block comprising:
a lead block body comprising an electrically insulating material;
a plurality of bus bars partially provided in the lead block body and comprising a conductive material;
the plurality of bus bars comprising:
a plurality of connection pins exposed from the lead block body and electrically connectable to a connector of an external electrical cable; and
a plurality of conductor connecting portions exposed from the lead block body and configured to be electrically connected to a plurality of conductors of an electrical cable, respectively;
the plurality of conductor connecting portions each extending in a longitudinal direction and being disposed at intervals in an arrangement direction perpendicular to the longitudinal direction;
at least one of the plurality of conductor connecting portions comprising:
an exposed surface facing a perpendicular direction perpendicular to the longitudinal direction and the arrangement direction; and
a connection projection protruding from the exposed surface in the perpendicular direction and configured to be connected to a conductor of the plurality of conductors of the electrical cable;
the connection projection being disposed in a first region with respect to the exposed surface in the perpendicular direction;
the lead block body comprising a cable-facing surface provided facing the electrical cable in a state where the connection projection is connected to the conductor of the electrical cable;
the cable-facing surface being offset in the perpendicular direction from the exposed surface and being disposed in the first region with respect to the exposed surface;
the connection projection of the at least one of the plurality of conductor connecting portions being fixed to corresponding one of the plurality of conductors of the electrical cable to secure a distance between the exposed surface and the plurality of conductors of the electrical cable;
the connection projection having a width defined in the longitudinal direction;
the cable-facing surface being disposed at an interval of a second distance from the connection projection in the longitudinal direction; and
the second distance being greater than the width of the connection projection.

2. The lead block according to claim 1, wherein
the connection projection has a first length defined in the perpendicular direction from the exposed surface,
the cable-facing surface is offset in the perpendicular direction from the exposed surface by a first distance, and
the first length is equal to or greater than the first distance.

3. The lead block according to claim 2, wherein
the cable-facing surface has a second length defined in the longitudinal direction, and
the second distance is equal to or less than the second length.

4. The lead block according to claim 1, wherein
the plurality of connection pins are disposed in a first longitudinal region with respect to the connection projection in the longitudinal direction,
the cable-facing surface is disposed in a second longitudinal region with respect to the connection projection in the longitudinal direction, and
the second longitudinal region is defined on an opposite side of the first longitudinal region with respect to the connection projection in the longitudinal direction.

5. The lead block according to claim 1, wherein
the at least one of the plurality of conductor connecting portions comprises:
a back surface provided on a back side of the exposed surface; and
a recess provided in the back surface and disposed at a position corresponding to that of the connection projection in the longitudinal direction.

6. The lead block according to claim 1, wherein
the lead block body comprises a projection protruding in the perpendicular direction from the cable-facing surface.

7. The lead block according to claim 6, wherein
the projection is offset from the connection projection in the arrangement direction.

8. The lead block according to claim 1, wherein
the plurality of bus bars comprise a plurality of intermediate portions provided between the plurality of connection pins and the plurality of conductor connecting portions and corresponding to the plurality of bus bars, respectively, and
the plurality of intermediate portions are at least partially provided in the lead block body.

9. The lead block according to claim 1, wherein
each of the plurality of bus bars comprises a first longitudinal end and a second longitudinal end,
each of the plurality of connection pins comprises the first longitudinal end,
each of the plurality of conductor connecting portions comprises the second longitudinal end, and
the second longitudinal end is at least partially provided in the lead block body.

10. The lead block according to claim 9, wherein
the second longitudinal end comprises an end face facing the longitudinal direction, and
the end face of the second longitudinal end is entirely covered by the lead block body.

11. A rotary connector device comprising:
a stator;
a rotator provided rotatably about a rotation axis with respect to the stator;
the lead block according to claim 1; and
the electrical cable electrically connected to the connection projection of the lead block.

12. The lead block according to claim 6, wherein
the electrical cable includes a support hole, and
the projection is provided in the support hole in the state where the connection projection is connected to the conductor of the electrical cable.

* * * * *